(12) United States Patent
Medles (10) Patent No.: US 11,223,444 B2
(45) Date of Patent: Jan. 11, 2022

(54) METHOD AND APPARATUS FOR CHANNEL QUALITY INFORMATION REPORTING UNDER DISCONTINUOUS RECEPTION IN MOBILE COMMUNICATIONS

(71) Applicant: MediaTek Singapore Pte. Ltd., Singapore (SG)

(72) Inventor: Abdelkader Medles, Cambridge (GB)

(73) Assignee: MediaTek Singapore Pte. Ltd., Singapore (SG)

(*) Notice: Subject to any disclaimer, the term of this patent is extended or adjusted under 35 U.S.C. 154(b) by 33 days.

(21) Appl. No.: 16/817,587

(22) Filed: Mar. 12, 2020

(65) Prior Publication Data
US 2020/0295868 A1    Sep. 17, 2020

Related U.S. Application Data

(60) Provisional application No. 62/818,158, filed on Mar. 14, 2019.

(51) Int. Cl.
| | | |
|---|---|---|
| *H04L 1/00* | (2006.01) | |
| *H04W 76/28* | (2018.01) | |
| *H04W 52/02* | (2009.01) | |
| *H04W 72/04* | (2009.01) | |
| *H04W 74/00* | (2009.01) | |

(Continued)

(52) U.S. Cl.
CPC ......... *H04L 1/0026* (2013.01); *H04B 7/0626* (2013.01); *H04W 24/10* (2013.01); *H04W 52/0216* (2013.01); *H04W 52/0235* (2013.01); *H04W 72/0406* (2013.01); *H04W 74/002* (2013.01); *H04W 76/28* (2018.02)

(58) Field of Classification Search
None
See application file for complete search history.

(56) References Cited

U.S. PATENT DOCUMENTS

| | | | | |
|---|---|---|---|---|
| 2014/0314030 | A1* | 10/2014 | Wang | H04W 76/10 370/329 |
| 2015/0282080 | A1 | 10/2015 | Maattanen et al. | |
| 2018/0368112 | A1* | 12/2018 | Sebeni | H04W 52/0209 |

FOREIGN PATENT DOCUMENTS

| | | |
|---|---|---|
| CN | 109219116 A | 1/2019 |
| WO | WO 2013115914 A1 | 8/2013 |

OTHER PUBLICATIONS

China National Intellectual Property Administration, International Search Report and Written Opinion for PCT/CN2020/079267, dated Jun. 22, 2020.

(Continued)

*Primary Examiner* — Ayanah S George
(74) *Attorney, Agent, or Firm* — Han IP PLLC; Andy M. Han (57) ABSTRACT

Various solutions for channel quality information reporting under discontinuous reception (DRX) with respect to user equipment and network apparatus in mobile communications are described. An apparatus may receive a configuration from a network node to report channel quality information. The apparatus may monitor an indication mechanism while in a power saving mode. The apparatus may determine whether a DRX on duration is cancelled by the indication mechanism. The apparatus may transmit the channel quality information to the network node in an event that the DRX on duration is cancelled by the indication mechanism.

18 Claims, 4 Drawing Sheets

(51) Int. Cl.
*H04B 7/06* (2006.01)
*H04W 24/10* (2009.01)

(56) References Cited

OTHER PUBLICATIONS

Mediatek Inc., NR UE Power Saving Designs, 3GPP TSG RAN WG1 Meeting #96, R1-1903353, Athens, Greece, Feb. 25-Mar. 1, 2019.
Mediatek Inc., Remaining details on power saving signal/channel, 3GPP TSG RAN WG1 Meeting #96bis, R1-1911057, Chongqing, China, Oct. 14-20, 2019.
Mediatek Inc., Remaining details on power saving signal, 3GPP TSG RAN WG1 Meeting #99, R1-1912095, Reno, USA, Nov. 18-22, 2019.

* cited by examiner

METHOD AND APPARATUS FOR CHANNEL QUALITY INFORMATION REPORTING UNDER DISCONTINUOUS RECEPTION IN MOBILE COMMUNICATIONS

CROSS REFERENCE TO RELATED PATENT APPLICATION(S)

The present disclosure is part of a non-provisional application claiming the priority benefit of U.S. Patent Application No. 62/818,158, filed on 14 Mar. 2019, the content of which is incorporated by reference in its entirety.

TECHNICAL FIELD

The present disclosure is generally related to mobile communications and, more particularly, to channel quality information reporting under discontinuous reception (DRX) with respect to user equipment and network apparatus in mobile communications.

BACKGROUND

Unless otherwise indicated herein, approaches described in this section are not prior art to the claims listed below and are not admitted as prior art by inclusion in this section.

In Long-Term Evolution (LTE) or New Radio (NR), for a user equipment (UE) in the connected mode, data exchange with the network is expected to be sporadic. The UE will spend most of its time only for monitoring physical downlink control channel (PDCCH). Even for data intensive activities such as video streaming, with improvements in data rates in NR, it is expected that the video data is buffered fairly quickly, and the UE drops into a state of data inactivity during which only PDCCH monitoring takes place. Such state will cause unnecessary power consumption and is not beneficial for UE power management. Hence, a discontinuous reception (DRX) mechanism is introduced to reduce UE power consumption.

Some mechanisms are further proposed as an enhancement to the DRX mechanism for power saving at UE side. For example, a WUI mechanism may be used to indicate to a UE to expect activity. The UE may be configured to monitor the WUI on predetermined occasions. Upon receiving a WUI, the UE may wake up to monitor a configured search space for downlink (DL)/uplink (UL) scheduling. Without receiving a WUI, the UE may keep staying in the power saving mode. However, these mechanisms may raise another problem.

When using the DRX mechanism, in addition to monitoring PDCCH for activity, the on duration of the DRX mechanism further provides a window during which link maintenance can be performed. The network node needs to receive link maintenance information about the channel before being able to schedule the UE. If the on duration is dropped since it is replaced by these mechanisms, the background link maintenance can no longer be performed leading to link maintenance failure. The use of these mechanisms compounds the problem of absence of link maintenance information at the UE wake-up time, since the UE may have been in a sleep mode for a long time. When the WUI is used to signal to the UE, the network node may not know on which beam to transmit the WUI. Assuming that the WUI is a very reliable signal/channel and may not need beam knowledge, the subsequent CSI report request at the start or before the wake-up duration is able to transmit to the UE without the link maintenance information.

Accordingly, for the newly introduced power saving mechanism, how to perform link maintenance activities for a UE in the power saving mode or sleep mode becomes an important issue in the newly developed wireless communication network. Therefore, it is needed to provide better schemes to properly acquire and report the channel quality information to the network node.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to channel quality information reporting under DRX with respect to user equipment and network apparatus in mobile communications.

In one aspect, a method may involve an apparatus receiving a configuration from a network node to report channel quality information. The method may also involve the apparatus monitoring an indication mechanism while in a power saving mode. The method may further involve the apparatus determining whether a DRX on duration is cancelled by the indication mechanism. The method may further involve the apparatus transmitting the channel quality information to the network node in an event that the DRX on duration is cancelled by the indication mechanism.

In one aspect, an apparatus may comprise a transceiver which, during operation, wirelessly communicates with a network node of a wireless network. The apparatus may also comprise a processor communicatively coupled to the transceiver. The processor, during operation, may perform operations comprising receiving, via the transceiver, a configuration from a network node to report channel quality information. The processor may also perform operations comprising monitoring, via the transceiver, an indication mechanism while in a power saving mode. The processor may further perform operations comprising determining whether a DRX on duration is cancelled by the indication mechanism. The processor may further perform operations comprising transmitting, via the transceiver, the channel quality information to the network node in an event that the DRX on duration is cancelled by the indication mechanism.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT), Narrow Band Internet of Things (NB-IoT) and Industrial Internet of Things (IIoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to channel quality information reporting under DRX with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In LTE or NR, for a UE in the connected mode, data exchange with the network is expected to be sporadic. The UE will spend most of its time only for monitoring the PDCCH. Even for data intensive activities such as video streaming, with improvements in data rates in NR, it is expected that the video data is buffered fairly quickly, and the UE drops into a state of data inactivity during which only PDCCH monitoring takes place. Such state will cause unnecessary power consumption and is not beneficial for UE power management. Hence, a DRX mechanism is introduced to reduce UE power consumption.

The DRX mechanism in NR that is inherited from LTE, requires the UE to intermittently monitor PDCCH, allowing the UE to transit to a sleep mode in an interval. The DRX on duration defines a period of time every DRX cycle that the UE monitors for potential activity. On the occurrence of activity during the on duration (e.g., the reception of a DCI scheduling uplink (UL) and/or downlink (DL) activities), the DRX inactivity timer is triggered. The DRX inactivity timer restarts each time data is exchanged between the UE and the network, keeping the UE awake while data exchange takes place. On the expiry of the inactivity timer, the UE goes back to sleep. The UE will monitor for activity again in next on duration.

However, the level of power savings that can be achieved with DRX is down to the network configuration. The percentage of time in a DRX cycle that a UE needs to stay awake for, directly corresponds to the power savings possible. The monitoring window of the DRX mechanism (e.g., DRX on duration) can be quite long (e.g., 10 ms) which causes the UE to burn power for downlink monitoring. The UE power consumption is unable to be properly controlled if the network configuration is not well designed.

Accordingly, some mechanisms are further proposed as an enhancement to the DRX framework for power saving at UE side. For example, a WUI mechanism may be used to indicate to a UE to expect activity. The UE may be configured to monitor the WUI on predetermined occasions. Upon receiving a WUI, the UE may wake up (e.g., exit from the power saving mode) to monitor a configured search space for DL/UL scheduling. Without receiving a WUI, the UE may keep staying in the power saving mode. However, these mechanisms may raise another problem.

Figure 1:
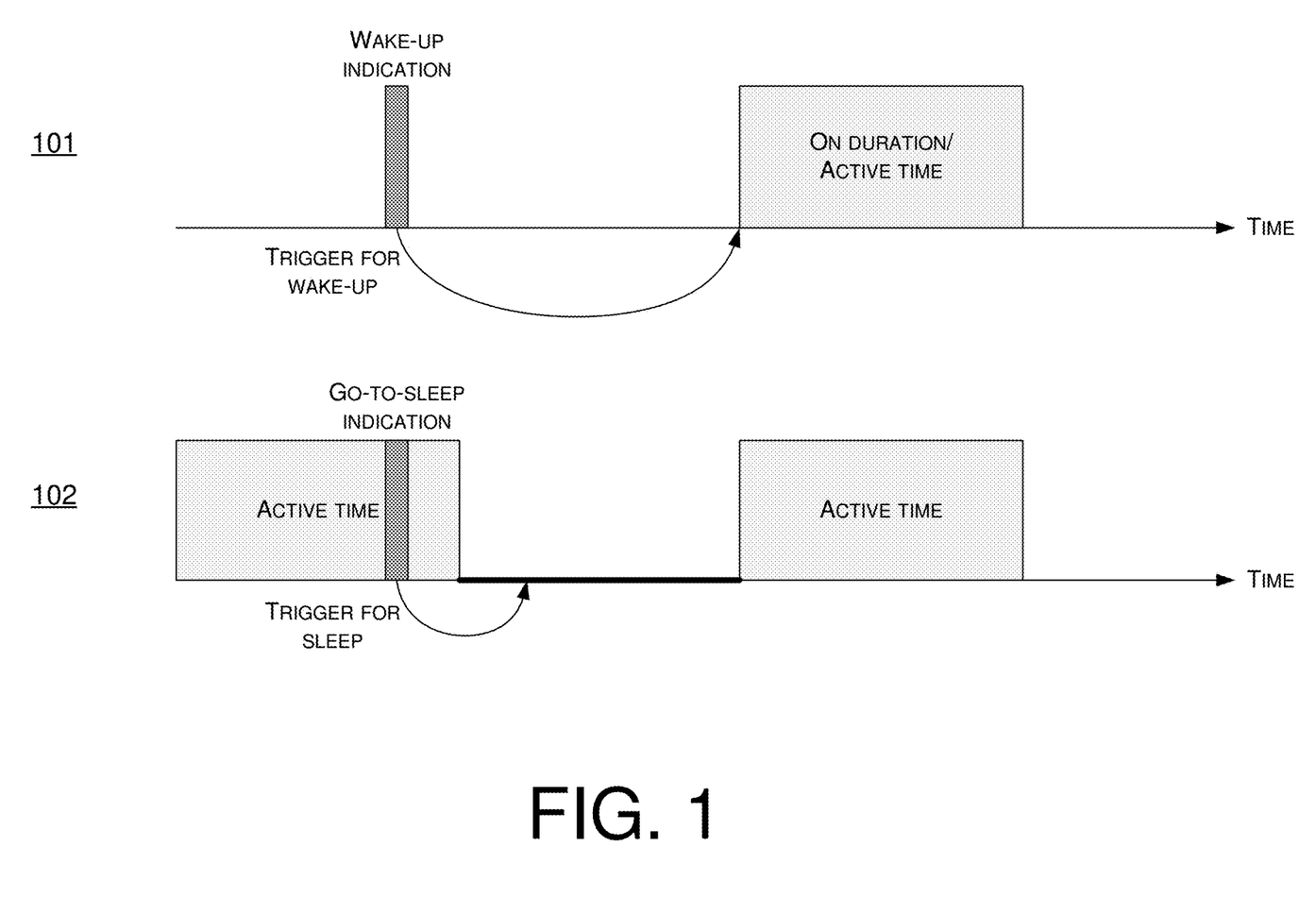
FIG. 1 is a diagram depicting example scenarios under schemes in accordance with implementations of the present disclosure.

FIG. 1 illustrates example scenarios 101 and 102 under schemes in accordance with implementations of the present disclosure. Scenarios 101 and 102 involve a UE and a network node, which may be a part of a wireless communication network (e.g., an LTE network, an LTE-Advanced network, an LTE-Advanced Pro network, a 5G network, an NR network, an IoT network, an NB-IoT network or an IIoT network). Scenario 101 illustrates the WUI mechanism mentioned in the present disclosure. The UE may be in the power saving mode. For example, the UE may be configured with the DRX mechanism with periodic on duration or active time. The network node may use the WUI mechanism to indicate the UE whether it should wake up during the next DRX cycle corresponding to the configured on duration for possible DL/UL transmissions. The WUI mechanism may be used to trigger or cancel wake-up for the DRX on duration. For example, in an event that the WUI is equal to 1, the UE may be configured to wake up in the next DRX on duration. In an event that the WUI is equal to 0, the UE may be configured not to wake up in the next DRX on duration and keep staying in the sleep mode. In another example, the on duration may be cancelled when an indication is received or by the absence of the indication. The behaviors of the WUI mechanism may be configured by a higher layer configuration (e.g., radio resource control (RRC) configuration). With the WUI mechanism, the UE doesn't need to wake up for every DRX on duration. The power consumption of the UE may be further reduced.

Scenario 102 illustrates the GSI mechanism mentioned in the present disclosure. The network node may use the GSI mechanism to indicate the UE that it should transit into a sleep mode or power saving mode for power saving. The GSI mechanism may be used to indicate the UE when to go to sleep for a certain duration. The behaviors of the GSI mechanism may be configured by a higher layer configuration (e.g., RRC configuration). For example, after receiving the GSI, the UE may go to sleep for a certain duration and wake up after the duration. During the sleep mode (e.g., outside of on duration or active time) of the WUI or GSI mechanism, the UE may not perform any PDCCH monitoring and link maintenance activity. For example, the UE may not transmit any channel quality information to the network node. The network node may not get any link maintenance information from the UE during the sleep duration.

When using the DRX mechanism, in addition to monitoring PDCCH for activity, the on duration of the DRX mechanism further provides a window during which link maintenance can be performed. The network node needs to receive link maintenance information about the channel (e.g., channel quality information) before being able to schedule the UE. If the on duration is cancelled due to the WUI mechanism, the link maintenance activities could no longer be performed leading to link maintenance failure. The use of WUI mechanism compounds the problem of absence of link maintenance information from the UE, since the UE may have been in a sleep mode for a long time. For example, when the WUI is used to signal to the UE, the network node may not know on which beam to transmit the WUI. Assuming that the WUI is a very reliable signal/channel and may not need beam knowledge, the subsequent CSI report request at the start or before the wake-up duration may not be able to transmit to the UE without the link maintenance information. An aperiodic DCI triggered reporting cannot be used since the transmission of the DCI also needs the link maintenance information (e.g., beam knowledge).

In view of the above, the present disclosure proposes a number of schemes pertaining to channel quality information reporting under DRX with respect to the UE and the network apparatus. According to the schemes of the present disclosure, the channel quality information reporting may still be performed under the DRX mechanism with an indication mechanism. An on duration of the DRX mechanism may be cancelled by the indication mechanism. For example, the indication mechanism may indicate the UE to wake up in an event that a specific DCI format (e.g., DCI format 2_6) is not detected outside the active time. Alternatively, the indication mechanism may indicate that when the indication is absent, the UE does not wake up in an event that a specific DCI format is not detected outside the active time. However, the indication mechanism merely cancels the PDCCH monitoring and may not cancel the channel quality information reporting. The UE may still be able to report the link maintenance information to the network node even when the DRX on duration is cancelled by the indication mechanism. Therefore, the network node is able to schedule the UE with the link maintenance information of the channel after waking up the UE from the powering saving mode.

Specifically, the UE may be configured to receive a configuration (e.g., RRC configuration) from the network node to report the channel quality information. The UE may be configured with a power saving mode (e.g., DRX mechanism). The UE may be configured to monitor an indication mechanism (e.g., WUI mechanism or GSI mechanism) while in the power saving mode. The UE may determine whether a DRX on duration is cancelled by the indication mechanism. In an event that the DRX on duration is cancelled by the indication mechanism, the UE may be configured to still transmit the channel quality information to the network node. The channel quality information may comprise at least one of a channel state information (CSI), a sounding reference signal (SRS), and a layer 1-reference signal received power (L1-RSRP). The indication mechanism may comprise at least one of the WUI mechanism and the GSI mechanism.

Figure 2:
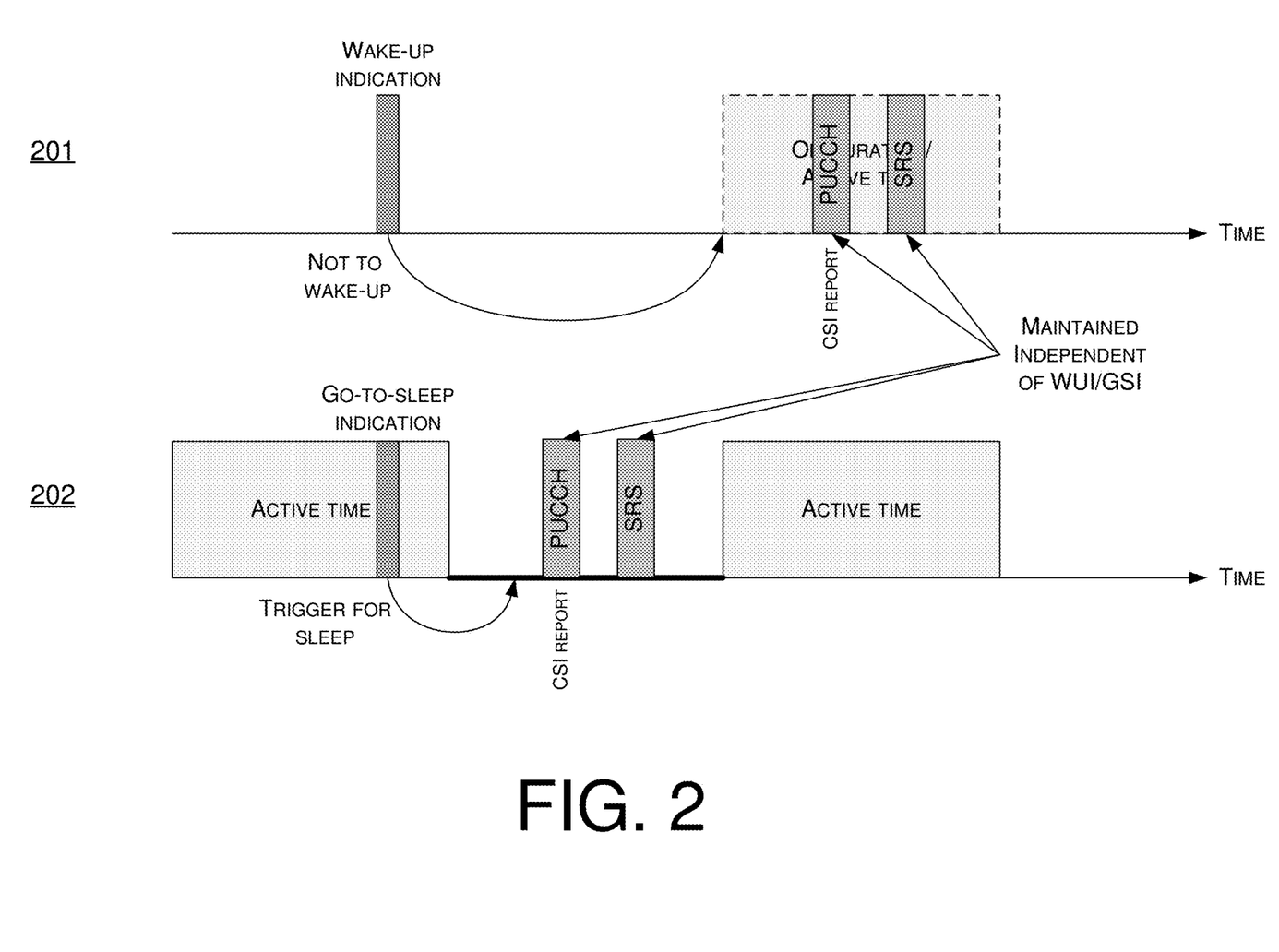
FIG. 2 is a diagram depicting example scenarios under schemes in accordance with implementations of the present disclosure.

FIG. 2 illustrates example scenarios 201 and 202 under schemes in accordance with implementations of the present disclosure. Scenarios 201 and 202 involve a UE and a network node, which may be a part of a wireless communication network (e.g., an LTE network, an LTE-Advanced network, an LTE-Advanced Pro network, a 5G network, an NR network, an IoT network, an NB-IoT network or an IIoT network). Scenario 201 illustrates the WUI mechanism with enhanced channel quality information reporting proposed in the present disclosure. The UE may be in the power saving mode. For example, the UE may be configured with the DRX mechanism with periodic on duration or active time. The network node may use the WUI mechanism to indicate the UE whether it should wake up during the next DRX cycle corresponding to the configured on duration for possible DL/UL transmissions.

In an event that the WUI mechanism indicates the UE not to wake up in the next DRX on duration (e.g., the DRX on duration is cancelled by the WUI mechanism), the UE may be configured to cancel the PDCCH monitoring but still transmit the channel quality information to the network node during the cancelled DRX on duration. For example, the UE may be configured to transmit the CSI report and/or L1-RSRP to the network node during the cancelled DRX on duration. The CSI report and/or L1-RSRP may be transmitted via the physical uplink control channel (PUCCH) or physical uplink shared channel (PUSCH). The UE may also be configured to transmit the SRS to the network node during the cancelled DRX on duration. The cancelled DRX on duration may be a time duration indicated by a DRX on duration timer or a time duration configured by the configuration (e.g., RRC configuration).

According to the enhanced channel quality information reporting proposed in the present disclosure, the WUI mechanism merely cancel the PDCCH morning. Other procedures such as periodic CSI reporting or periodic SRS transmission may still be perform by the UE. The UE may be configured to perform the channel state information-reference signal (CSI-RS) acquisition during the cancelled DRX on duration. Thus, the UE may transmit the channel quality information to the network node regardless of the indication (e.g., WUI). The channel quality information reporting may be maintained independent of the WUI mechanism. The link maintenance failure due to lake of channel quality information can be avoided.

In some implementations, when the UE is configured to monitor an indication (e.g., downlink control information (DCI) format 2_6) in an event that the UE is configured by higher layer parameter (e.g., PS-Periodic CSI TransmitOrNot) to report CSI with the higher layer parameter (e.g., reportConfigType) set to periodic when a timer (e.g., drx-onDurationTimer) is not started, the UE shall report CSI during the time duration indicated by the timer (e.g., drx-onDurationTimer) also outside active time according to CSI reporting configurations. Also, when the UE is configured to monitor an indication (e.g., downlink control information (DCI) format 2_6) in an event that the UE is configured by higher layer parameter (e.g., PS Periodic L1-RSRP TransmitOrNot) to report L1-RSRP with the higher layer parameter (e.g., reportConfigType) set to periodic when a timer (e.g., drx-onDurationTimer) is not started, the UE shall report L1-RSRP during the time duration indicated by the timer (e.g., drx-onDurationTimer) also outside active time according to CSI reporting configurations.

Scenario 202 illustrates the GSI mechanism with enhanced channel quality information reporting proposed in the present disclosure. The network node may use the GSI mechanism to indicate the UE that it should transit into a sleep mode for a certain duration. The DRX on duration or active time may be cancelled during the sleep duration due to the GSI mechanism. However, during the sleep duration, the UE may be configured to cancel the PDCCH monitoring but still transmit the channel quality information to the network node. For example, the UE may be configured to transmit the CSI report and/or L1-RSRP to the network node during the sleep duration or outside the active time. The CSI report and/or L1-RSRP may be transmitted via the PUCCH or PUSCH. The UE may also be configured to transmit the SRS to the network node during the sleep duration or outside the active time.

According to the enhanced channel quality information reporting proposed in the present disclosure, the GSI mechanism merely cancel the PDCCH morning. Other procedures such as periodic CSI reporting or periodic SRS transmission may still be perform by the UE. The UE may be configured to perform the CSI-RS acquisition during the sleep duration or outside the active time. Thus, the UE may transmit the channel quality information to the network node regardless of the indication mechanism (e.g., GSI mechanism). The channel quality information reporting may be maintained independent of the GSI mechanism. The link maintenance failure due to lake of channel quality information can be avoided.

Illustrative Implementations

Figure 3:
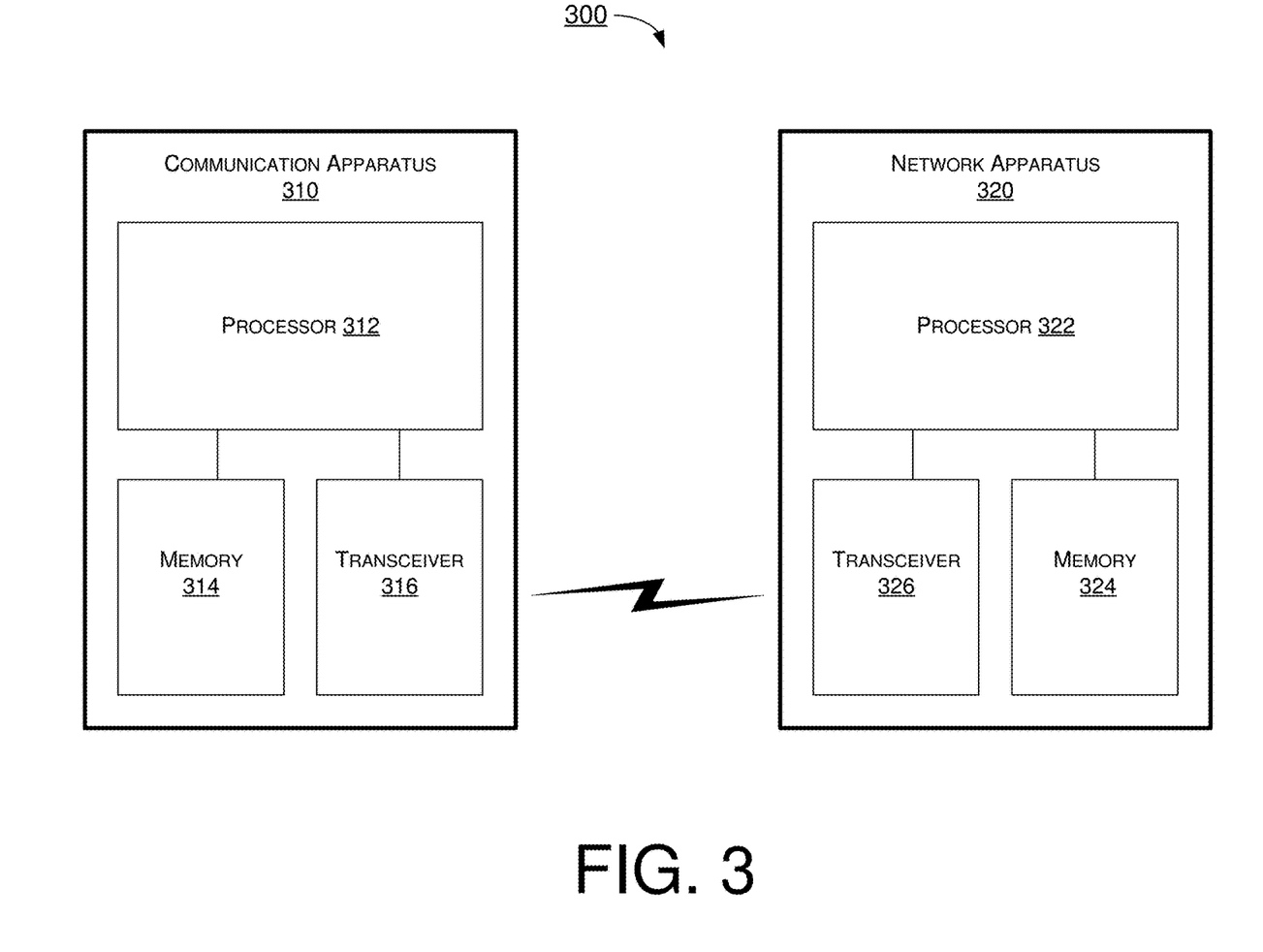
FIG. 3 is a block diagram of an example communication apparatus and an example network apparatus in accordance with an implementation of the present disclosure.
Figure 4:
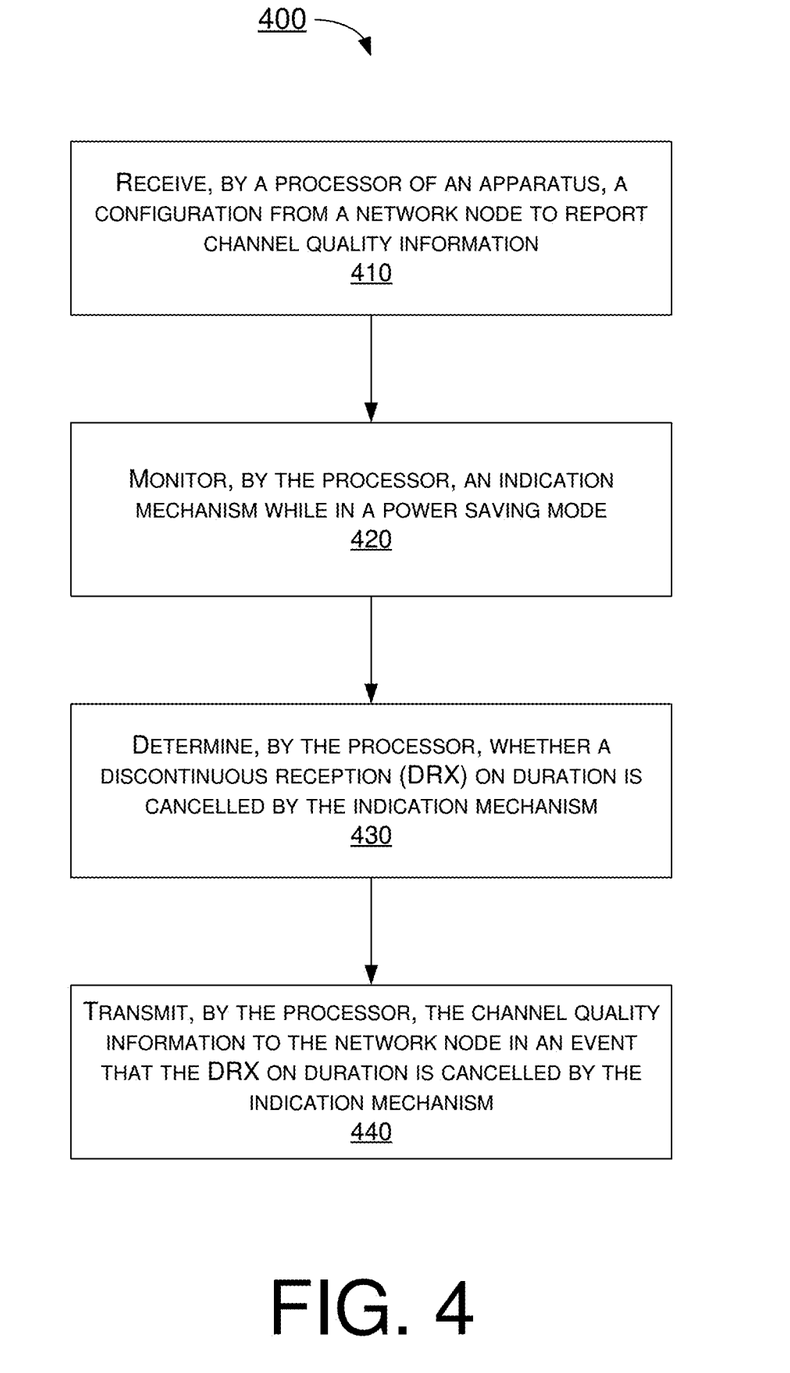
FIG. 4 is a flowchart of an example process in accordance with an implementation of the present disclosure.

FIG. 3 illustrates an example communication apparatus 310 and an example network apparatus 320 in accordance with an implementation of the present disclosure. Each of communication apparatus 310 and network apparatus 320 may perform various functions to implement schemes, techniques, processes and methods described herein pertaining to channel quality information reporting under DRX with respect to user equipment and network apparatus in wireless communications, including scenarios and mechanisms described above as well as process 400 described below.

Communication apparatus 310 may be a part of an electronic apparatus, which may be a UE such as a portable or mobile apparatus, a wearable apparatus, a wireless communication apparatus or a computing apparatus. For instance, communication apparatus 310 may be implemented in a smartphone, a smartwatch, a personal digital assistant, a digital camera, or a computing equipment such as a tablet computer, a laptop computer or a notebook computer. Communication apparatus 310 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 310 may be implemented in a smart thermostat, a smart fridge, a smart door lock, a wireless speaker or a home control center. Alternatively, communication apparatus 310 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 310 may include at least some of those components shown in FIG. 3 such as a processor 312, for example. Communication apparatus 310 may further include one or more other components not pertinent to the proposed scheme of the present disclosure (e.g., internal power supply, display device and/or user interface device), and, thus, such component(s) of communication apparatus 310 are neither shown in FIG. 3 nor described below in the interest of simplicity and brevity.

Network apparatus 320 may be a part of an electronic apparatus, which may be a network node such as a base station, a small cell, a router or a gateway. For instance, network apparatus 320 may be implemented in an eNodeB in an LTE, LTE-Advanced or LTE-Advanced Pro network or in a gNB in a 5G, NR, IoT, NB-IoT or IIoT network. Alternatively, network apparatus 320 may be implemented in the form of one or more IC chips such as, for example and without limitation, one or more single-core processors, one or more multi-core processors, or one or more RISC or CISC processors. Network apparatus 320 may include at least some of those components shown in FIG. 3 such as a processor 322, for example. Network apparatus 320 may further include one or more other components not pertinent to the proposed scheme of the present disclosure (e.g., internal power supply, display device and/or user interface device), and, thus, such component(s) of network apparatus 320 are neither shown in FIG. 3 nor described below in the interest of simplicity and brevity.

In one aspect, each of processor 312 and processor 322 may be implemented in the form of one or more single-core processors, one or more multi-core processors, or one or more CISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including power consumption reduction in a device (e.g., as represented by communication apparatus 310) and a network (e.g., as represented by network apparatus 320) in accordance with various implementations of the present disclosure.

In some implementations, communication apparatus 310 may also include a transceiver 316 coupled to processor 312 and capable of wirelessly transmitting and receiving data. In some implementations, communication apparatus 310 may further include a memory 314 coupled to processor 312 and capable of being accessed by processor 312 and storing data therein. In some implementations, network apparatus 320 may also include a transceiver 326 coupled to processor 322 and capable of wirelessly transmitting and receiving data. In some implementations, network apparatus 320 may further include a memory 324 coupled to processor 322 and capable of being accessed by processor 322 and storing data therein. Accordingly, communication apparatus 310 and network apparatus 320 may wirelessly communicate with each other via transceiver 316 and transceiver 326, respectively. To aid better understanding, the following description of the operations, functionalities and capabilities of each of communication apparatus 310 and network apparatus 320 is provided in the context of a mobile communication environment in which communication apparatus 310 is implemented in or as a communication apparatus or a UE and network apparatus 320 is implemented in or as a network node of a communication network.

In some implementations, processor 312 may be configured to receive, via transceiver 316, a configuration (e.g., RRC configuration) from network apparatus 320 to report the channel quality information. Processor 312 may be configured with a power saving mode (e.g., DRX mechanism). Processor 312 may be configured to monitor, via transceiver 316, an indication mechanism (e.g., WUI mechanism or GSI mechanism) while in the power saving mode. Processor 312 may determine whether a DRX on duration is cancelled by the indication mechanism. In an event that the DRX on duration is cancelled by the indication mechanism, processor 312 may be configured to still transmit, via transceiver 316, the channel quality information to network apparatus 320.

In some implementations, processor 312 may be in the power saving mode. For example, processor 312 may be configured with the DRX mechanism with periodic on duration or active time. Processor 322 may use the WUI mechanism to indicate processor 312 whether it should wake up during the next DRX cycle corresponding to the configured on duration for possible DL/UL transmissions.

In some implementations, in an event that the WUI mechanism indicates processor 312 not to wake up in the next DRX on duration (e.g., the DRX on duration is cancelled by the WUI mechanism), processor 312 may be configured to cancel the PDCCH monitoring but still transmit the channel quality information to network apparatus 320 during the cancelled DRX on duration. For example, processor 312 may be configured to transmit, via transceiver 316, the CSI report and/or L1-RSRP to network apparatus 320 during the cancelled DRX on duration. Processor 312 may transmit the CSI report and/or L1-RSRP via the PUCCH or PUSCH. Processor 312 may also be configured to transmit, via transceiver 316, the SRS to network apparatus 320 during the cancelled DRX on duration. Processor 312 may transmit the channel quality information during a time duration indicated by a DRX on duration timer or a time duration configured by the configuration (e.g., RRC configuration).

In some implementations, processor 312 merely cancel the PDCCH morning. Other procedures such as periodic CSI reporting or periodic SRS transmission may still be perform by processor 312. Processor 312 may be configured to perform the CSI-RS acquisition during the cancelled DRX on duration. Thus, processor 312 may transmit, via transceiver 316, the channel quality information to network apparatus 320 regardless of the indication mechanism (e.g., WUI mechanism or GSI mechanism). Processor 312 may maintain the channel quality information reporting independent of the WUI mechanism and/or GSI mechanism.

In some implementations, processor 322 may use the GSI mechanism to indicate processor 312 that it should transit into a sleep mode for a certain duration. Processor 312 may cancel the DRX on duration or active time during the sleep duration due to the GSI mechanism. However, during the sleep duration, processor 312 may be configured to cancel the PDCCH monitoring but still transmit the channel quality information to network apparatus 320. For example, processor 312 may be configured to transmit, via transceiver 316, the CSI report and/or L1-RSRP to network apparatus 320 during the sleep duration or outside the active time. Processor 312 may transmit the CSI report and/or L1-RSRP via the PUCCH or PUSCH. Processor 312 may also be configured to transmit, via transceiver 316, the SRS to network apparatus 320 during the sleep duration or outside the active time.

Illustrative Processes

FIG. 4 illustrates an example process 400 in accordance with an implementation of the present disclosure. Process 400 may be an example implementation of above scenarios/ schemes, whether partially or completely, with respect to channel quality information reporting under DRX with the present disclosure. Process 400 may represent an aspect of implementation of features of communication apparatus 310. Process 400 may include one or more operations, actions, or functions as illustrated by one or more of blocks 410, 420, 430 and 440. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may be implemented by communication apparatus 310 or any suitable UE or machine type devices. Solely for illustrative purposes and without limitation, process 400 is described below in the context of communication apparatus 310. Process 400 may begin at block 410.

At 410, process 400 may involve processor 312 of apparatus 310 receiving a configuration from a network node to report channel quality information. Process 400 may proceed from 410 to 420.

At 420, process 400 may involve processor 312 monitoring an indication mechanism while in a power saving mode. Process 400 may proceed from 420 to 430.

At 430, process 400 may involve processor 312 determining whether a DRX on duration is cancelled by the indication mechanism. Process 400 may proceed from 430 to 440.

At 440, process 400 may involve processor 312 transmitting the channel quality information to the network node in an event that the DRX on duration is cancelled by the indication mechanism.

In some implementations, the channel quality information may comprise at least one of a CSI, an SRS, and an L1-RSRP.

In some implementations, the indication mechanism may comprise at least one of a WUI mechanism and a GSI mechanism.

In some implementations, process 400 may involve processor 312 transmitting the channel quality information via a PUCCH or a PUSCH.

In some implementations, process 400 may involve processor 312 transmitting the channel quality information during the cancelled DRX on duration.

In some implementations, process 400 may involve processor 312 transmitting the channel quality information during a time duration indicated by a DRX on duration timer.

In some implementations, process 400 may involve processor 312 transmitting the channel quality information during a time duration configured by the configuration.

In some implementations, process 400 may involve processor 312 transmitting the channel quality information to the network node regardless of the indication mechanism.

In some implementations, process 400 may involve processor 312 cancelling, a PDCCH monitoring according to the indication mechanism.

In some implementations, process 400 may involve processor 312 performing a CSI-RS acquisition during the cancelled DRX on duration.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    receiving, by a processor of an apparatus, a configuration from a network node to report channel quality information;
    monitoring, by the processor, an indication mechanism while in a power saving mode;
    determining, by the processor, whether a discontinuous reception (DRX) on duration is cancelled by the indication mechanism;
    transmitting, by the processor, the channel quality information to the network node in an event that the DRX on duration is cancelled by the indication mechanism; and
    performing, by the processor, a channel state information-reference signal (CSI-RS) acquisition during the cancelled DRX on duration.

2. The method of claim 1, wherein the channel quality information comprises at least one of a channel state information (CSI), a sounding reference signal (SRS), and a layer 1-reference signal received power (L1-RSRP).

3. The method of claim 1, wherein the indication mechanism comprises at least one of a wake-up indication (WUI) mechanism and a go-to-sleep indication (GSI) mechanism.

4. The method of claim 1, wherein the transmitting comprises transmitting the channel quality information via a physical uplink control channel (PUCCH) or a physical uplink shared channel (PUSCH).

5. The method of claim 1, wherein the transmitting comprises transmitting the channel quality information during the cancelled DRX on duration.

6. The method of claim 1, wherein the transmitting comprises transmitting the channel quality information during a time duration indicated by a DRX on duration timer.

7. The method of claim 1, wherein the transmitting comprises transmitting the channel quality information during a time duration configured by the configuration.

8. The method of claim 1, wherein the transmitting comprises transmitting the channel quality information to the network node regardless of the indication mechanism.

9. The method of claim 1, further comprising:
    cancelling, by the processor, a physical downlink control channel (PDCCH) monitoring according to the indication mechanism.

10. An apparatus, comprising:
    a transceiver which, during operation, wirelessly communicates with a network node of a wireless network; and
    a processor communicatively coupled to the transceiver such that, during operation, the processor performs operations comprising:

receiving, via the transceiver, a configuration from a network node to report channel quality information;

monitoring, via the transceiver, an indication mechanism while in a power saving mode;

determining whether a discontinuous reception (DRX) on duration is cancelled by the indication mechanism;

transmitting, via the transceiver, the channel quality information to the network node in an event that the DRX on duration is cancelled by the indication mechanism; and performing, via the transceiver, a channel state information-reference signal (CSI-RS) acquisition during the cancelled DRX on duration.

11. The apparatus of claim 10, wherein the channel quality information comprises at least one of a channel state information (CSI), a sounding reference signal (SRS), and a layer 1-reference signal received power (L1-RSRP).

12. The apparatus of claim 10, wherein the indication mechanism comprises at least one of a wake-up indication (WUI) mechanism and a go-to-sleep indication (GSI) mechanism.

13. The apparatus of claim 10, wherein, in transmitting the channel quality information, the processor transmits the channel quality information via a physical uplink control channel (PUCCH) or a physical uplink shared channel (PUSCH).

14. The apparatus of claim 10, wherein, in transmitting the channel quality information, the processor transmits the channel quality information during the cancelled DRX on duration.

15. The apparatus of claim 10, wherein, in transmitting the channel quality information, the processor transmits the channel quality information during a time duration indicated by a DRX on duration timer.

16. The apparatus of claim 10, wherein, in transmitting the channel quality information, the processor transmits the channel quality information during a time duration configured by the configuration.

17. The apparatus of claim 10, wherein, in transmitting the channel quality information, the processor transmits the channel quality information to the network node regardless of the indication mechanism.

18. The apparatus of claim 10, wherein, during operation, the processor further performs operations comprising:

cancelling a physical downlink control channel (PDCCH) monitoring according to the indication mechanism.

* * * * *